Feb. 4, 1958  A. OFFEN  2,822,223
HIGH SPEED BEARINGS
Filed April 4, 1955  4 Sheets-Sheet 1

Inventor:
Arthur Offen
By his attorney:
Baldwin & Wight

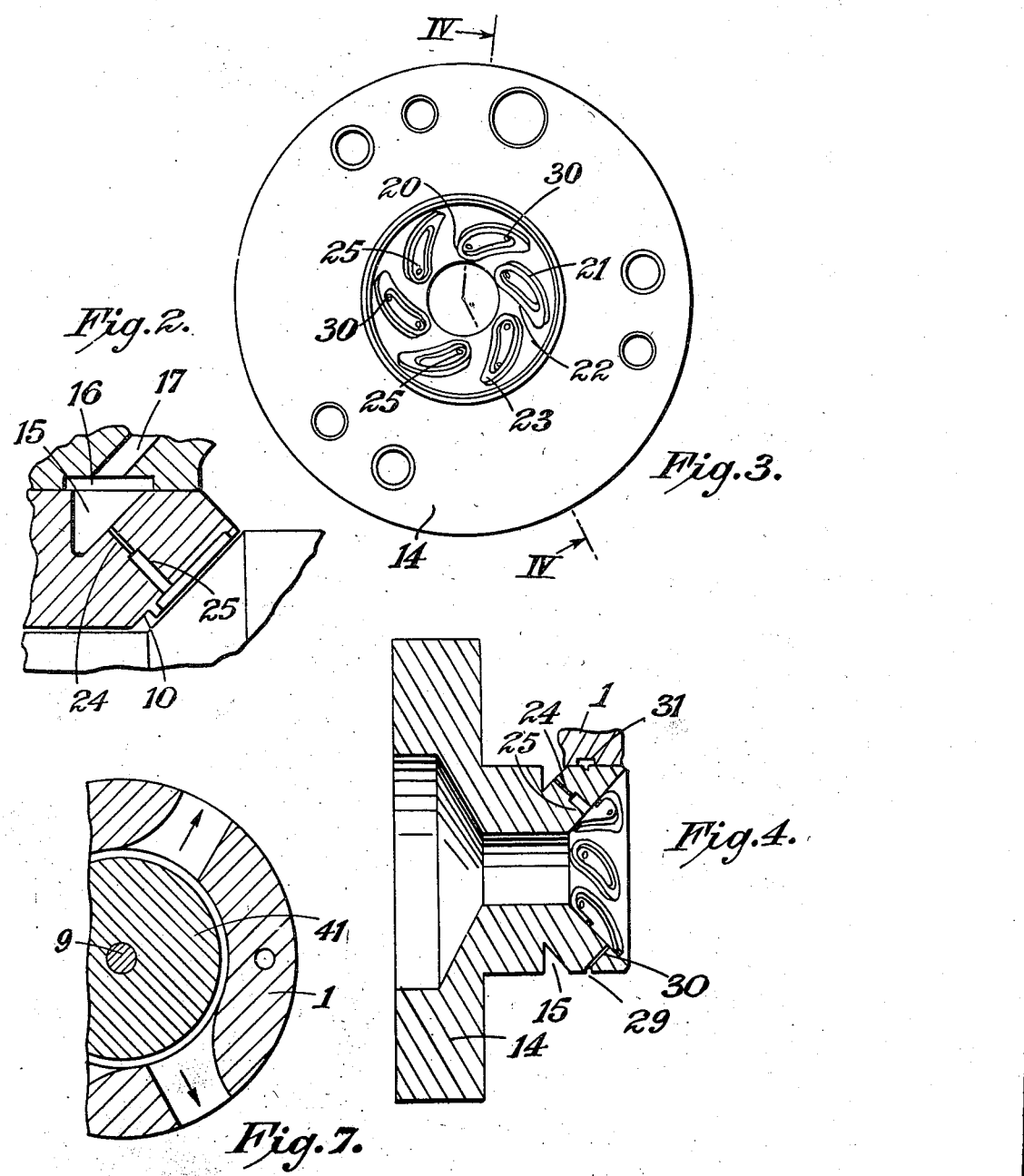

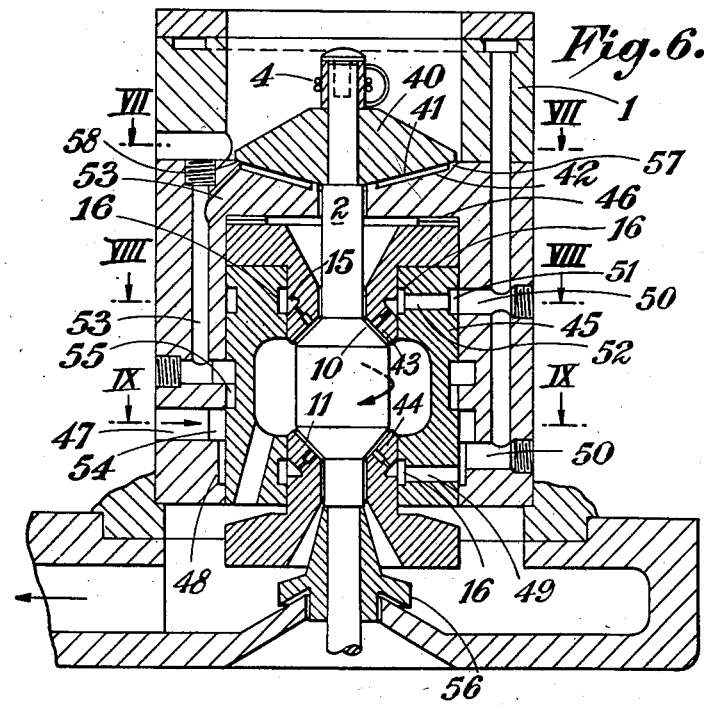
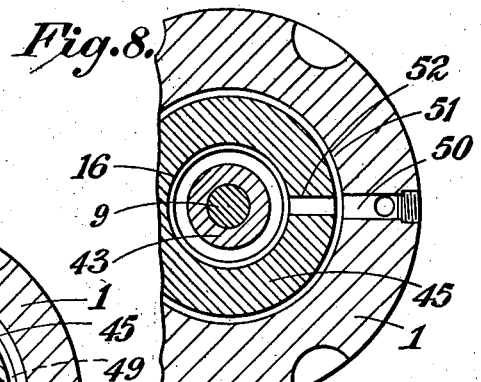
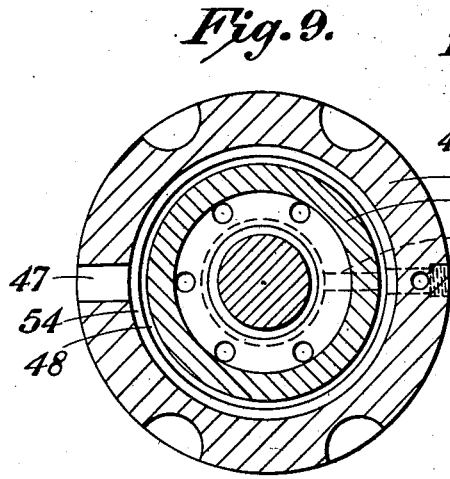

# United States Patent Office 2,822,223
Patented Feb. 4, 1958

2,822,223

HIGH SPEED BEARINGS

Arthur Offen, Churchfield, South Nutfield, England, assignor to Arthur Offen Developments Limited, London, England, a British company Application April 4, 1955, Serial No. 499,127

Claims priority, application Great Britain April 8, 1954

19 Claims. (Cl. 308—122)

The invention relates to bearings and is directed more particularly to bearings intended to run at extremely high speeds. An example of a machine requiring bearings satisfying such requirements is the lapping machine described in Britain Patent No. 718,028. With machines of this kind it may be necessary to run at such high speeds as 60,000 R. P. M. to 100,000 R. P. M.

According to the invention the bearing comprises two cooperating bearing parts, one normally stationary and the other rotatable in relation thereto, the adjacent working faces of which are adapted in normal operation to be spaced slightly apart to provide a narrow fluid space between them, in which the working face of the rotatable part is smooth and that of the normally stationary part is constituted by the tops of ridges in the form of loops enclosing one or more pockets, means being provided for continuously supplying under pressure to the or each pocket a fluid, which leaks away through the fluid space between the top of the ridge and the working face of the rotatable part.

When there are several pockets distributed around the axis, it is advantageous for the ridge surrounding each pocket to have its leading side concave inwards and its trailing side convex inwards and for the pocket to taper at its outer end to a point directed obliquely in the direction of rotation.

Figure 1:
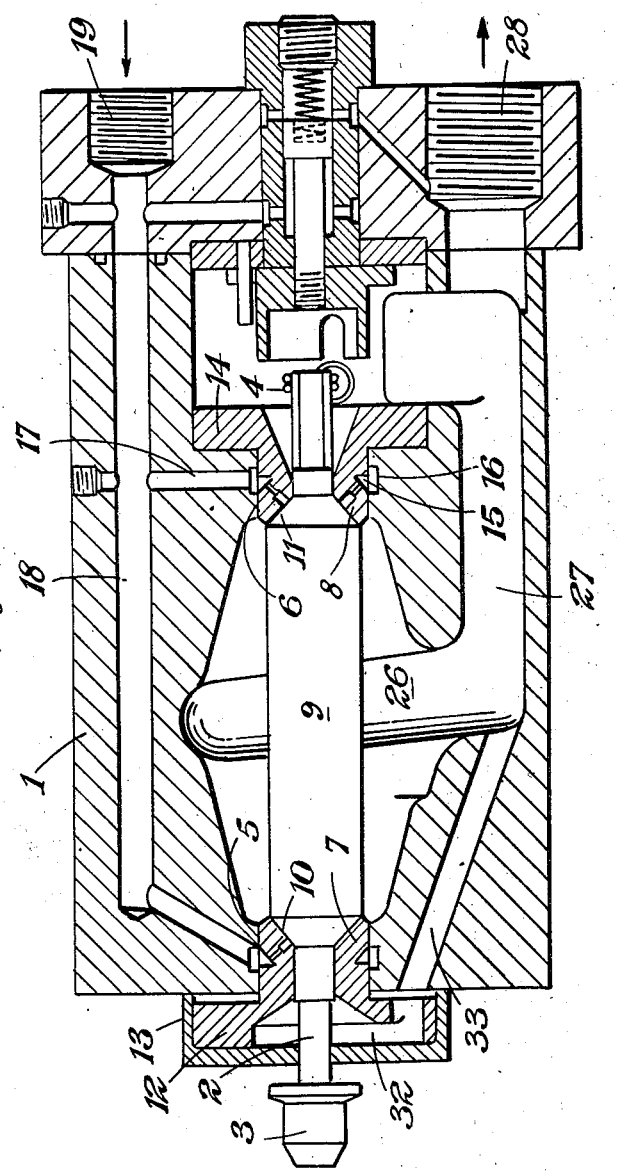
Figure 5:
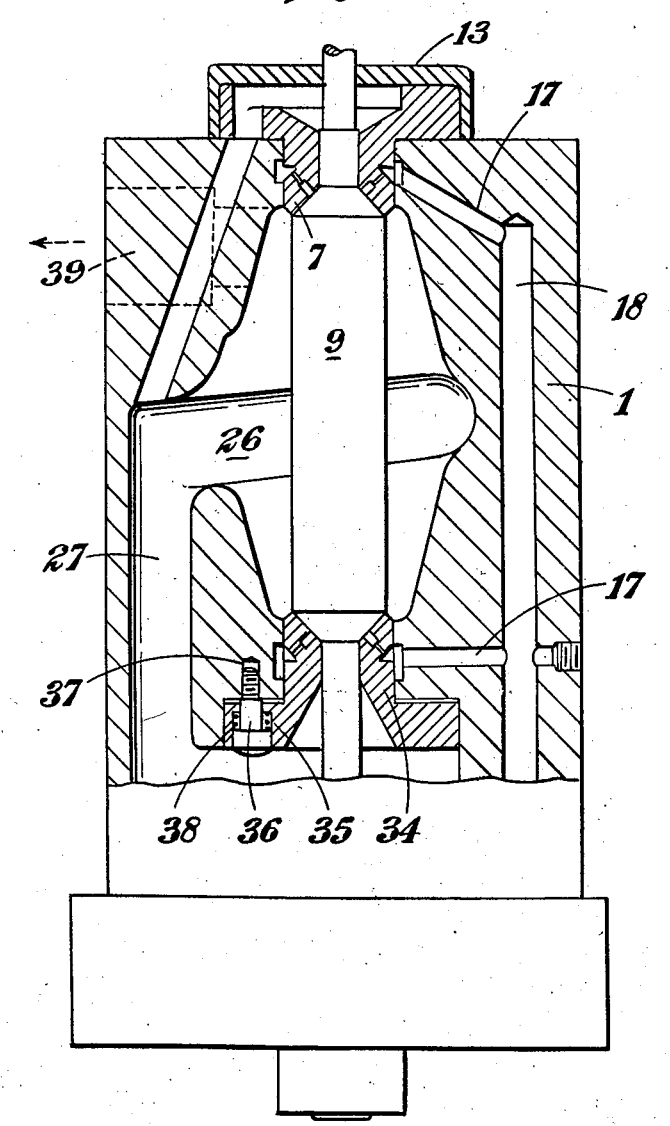

The invention is illustrated in the accompanying drawings showing bearings and details thereof suitable for use respectively on a high speed internal grinder and a lapping machine such as that described in the above mentioned patent specification, and therein Figure 1 is a central horizontal section through a combined journal and thrust bearing adapted to take the same load in all directions, Figure 2 is an enlarged view of a part at the upper left hand side of Figure 1, Figure 3 is an enlarged elevation of the left hand bearing part of Figure 1 viewed axially, Figure 4 is a section on the line IV—IV of Figure 3, Figure 5 is a view corresponding to Figure 1 of a vertical bearing for a lapping machine such as that referred to above, Figure 6 is a view corresponding to Figure 1 of a combined thrust and journal bearing adapted to take larger axial thrusts than the two previous forms of construction, Figure 7 is a fragmentary section of the line VII—VII of Figure 6, Figure 8 is a fragmentary section on the line VIII—VIII of Figure 6, and Figure 9 is a section on the line IX—IX of Figure 6.

Referring first to Figures 1 to 4, a housing 1 supports a shaft 2 by means of the bearing arrangements to be described. The shaft 2 has a chuck 3 at the left hand end for holding the shaft of a standard internal type grinding wheel. It is also provided with turbine blades 4 at the right hand end for setting it into rotation. The parts of Figure 1 immediately beyond the right hand end of the shaft 2 relate to the turbine drive and form no part of the present invention.

The housing 1 is hollow at the centre for a purpose to be described later and has a cylindrical bore 5 near the left and another cylindrical bore 6 towards the right. In the bores 5 and 6 are mounted normally stationary bearing parts 7 and 8 shown in greater detail in Figures 2, 3 and 4. The bearing part 7 is capable of sliding axially to a limited extent in its cylindrical bore in the housing 1. The working surface of the stationary part 7, which may be referred to as a bush, is conical with the apex to the left, while that of the bush 8 is likewise conical but with the apex to the right.

The shaft 2 has a centre part 9 of larger diameter than the parts projecting through the bearing bushes 7 and 8, the part 9 being terminated by shoulders 10 and 11 respectively of conical shape to fit the internal surfaces of the bushes 7 and 8. The bush 7 is integral with a flange 12 moveable axially by means of two sets of three screws each (not shown). The screws of one set enter tapped holes in the housing 1, and those of the other set move in tapped holes in the flange 12 to press against the end free of the housing. A cover 13 is provided to exclude any abrasive dust from the bearing. The bush 8 has a flange 14 by which it is fixed in the housing 1.

The operative parts of the bushes 7 and 8 are alike. A circumferential groove 15 (see Figure 2) around the cylindrical part of the bush registers with an internal circumferential groove 16 in the housing 1, which is connected by a duct 17 to a horizontal fluid supply duct 18 fed by a nipple at 19. The surface of each bearing bush 7—8, as may be seen from Figures 3 and 4, is of frusto-conical form with six flat topped ridges in the form of closed loops. The loops are rounded towards the inner part at 20. They are concave inwards at the leading edge 21 and convex inwards at the trailing edge 22, and they taper in a curvilinear manner outwards to a point 23 directed in the direction of rotation.

When the shaft is stationary, each conical journal 10, 11 makes contact with the whole of the top surface of the ridges surrounding the six associated pockets, but, as will be explained later, these surfaces are covered by a film of flowing fluid when the shaft is running. An oblique duct, approximately at right angles to the bearing surface, runs from the lower and inner part of each pocket to the groove 15. This duct consists of two parts, a part of very fine bore 24 next to the groove 15 and a part of rather larger bore 25 next to the pocket.

In operation a source of high pressure fluid, which may be at 1000 p. s. i. ( 68 atm.), is connected to the nipple 19, and the fluid passes through the duct 17 to the grooves 16 and 15 to near the inner ends 20 of the pockets by the ducts 24 and 25. The pressure of the fluid fed into the six pockets, which may be half that of the supply pressure, supports the thrust exerted by the shaft shoulder 10 against the bearing bush. There is a very slight gap between the ridges surrounding the pockets and the mating surface of the shaft, as is normal in the case of plain bearings, but in the present case this clearance is kept to a definite value by the use of a fluid of low viscosity such as paraffin with the admixture of a small proportion of lubricating oil.

The fluid seeps through as a thin film preferably about .001″ (0.025 mm.) between the top of the ridge and the shoulder 10 or 11 of the shaft, to be discharged mainly at the outer or larger diameter of the shaft. It collects in the hollow part 26 within the housing 1 and is discharged by a duct 27 through a nipple at 28, where suction may be applied if desired. Any fluid escaping along the left hand end of the shaft is contained by the cup 13 and passes by a duct 32 in the flange 12 and a duct 33 in the housing 1 to the duct 27.

The reason for the particular tear-drop shape of the ridges 20, 21, 22 and 23 surrounding the pockets is that with round or oval pockets there would be excessive turbulence of the fluid within the pocket, giving rise to friction and overheating. With the shape shown, having a tapered point running in the direction of rotation, the film of fluid issuing from between the tops of the ridges and the shoulder of the shaft is induced by capillary attraction to the shoulder surface to travel with the latter and with the effect of centrifugal force to follow a path defined by the pocket form.

If the shaft is decentred by a small fraction, it will be seen that the gaps between the ridges and the shaft shoulders 10 and 11 at one side become smaller and the gaps on the other side become larger. On the first side the pressure will rise to near the supply pressure on account of the greater restriction in the discharge of fluid; on the other side the pressure will fall to near zero owing to the freer flow of fluid, and the natural tendency will thus be for the shaft to be returned to its central position. With the arrangement described, the restoring force acting on the shaft due to the difference in pressure on the two sides may amount to the supply pressure multiplied by the area of one pocket.

It may be desired to ascertain the actual pressures in the pockets of the bearing. An addition is therefore made to the construction already described. A further circumferential groove 29 is formed in the cylindrical part of the bearing bush and is connected by a fine duct 30 to the outer end of one of the pockets. An additional groove 31 in the bore of the housing 1 provides communication with a pressure gauge (not shown). It is preferable to divide the grooves 29 and 31 into three parts by solid webs and to provide three ducts 30 spaced at 120° apart. It is possible then to adjust the bearing by observing simultaneously the three pressure gauges connected to the respective parts of the bearing.

In the operation of machines requiring such bearings as described above, it will usually be found advisable to make the hydraulic pump supplying the fluid start automatically with the starting of the machine. On shutting down this might involve the risk of having the machine still running at a high speed with no supply of fluid. The hydraulic system should therefore be provided with an accumulator to maintain the supply of fluid at least until the speed of the machine is low enough not to involve risk of damage to the bearing surfaces without the flow of fluid.

Figure 5 shows a bearing generally similar to that just described but with two modifications apart from its being intended for a vertical shaft. In this form the bearing bush 12 is of fixed location, and the bearing bush 8 of Figure 1 is replaced by a bearing bush 34 having three recesses 35 in its flange, only one of which is shown. Each recess accommodates a cheese headed screw 36, which enters a tapped hole 37 in the housing 1 and serves as an abutment for a spring 38. By this means the axial distance between the upper bearing bush 7 and the lower bearing bush 34 is made slightly variable by compression of the spring 38. The screws 36 serve to adjust the pressure exerted by the spring 38 in accordance with the thrust which the bearing is normally intended to support.

This figure also shows an alternative fluid discharge at 39 to take the place of the oil discharge 28 of Figure 1 when this is more convenient on account of the position which the bearing is mounted.

An alternative bearing combination in accordance with the invention is shown in Figures 6 to 9. This form of construction is suitable for cases in which a considerable axial thrust is to be supported. In the arrangement shown the shaft has a double journal bearing 10 and 11 similar to that described in connection with Figure 1. At the upper end of the shaft 2 a thrust bearing is mounted, which comprises a member 40 fixed on the shaft and having a slightly coned lower surface 41. The latter cooperates with a surface 42 formed at the top of the housing 1, which has a single annular pocket defined by an outer circular ridge 57.

In the bearing illustrated the thrust to be carried by the shaft acts in a downward direction. Since there may be a slight movement of the member 40 in relation to the housing 1, the bushes 43 and 44 of the journal bearing are carried in a cylindrical slider 45, so as to be capable of a certain amount of axial movement in the housing 1. A coil spring 46 exerts a small pressure on the thrust bearing, so that, if there is no actual working thrust, there will still be a small force tending to keep the thrust bearing surfaces in contact.

The fluid is fed in at a nipple 47 and enters the journal bearing by a circumferential duct 48, a radial duct 49 and cylindrical grooves 16 and 15 as in the case of Figure 1. For the upper bearing bush 43 the fluid passes from the groove 48 by radial and axial ducts 50 to an external circumferential groove 51 in the body 45 and thence by a radial duct 52 to grooves 16 and 15 as previously described.

A branch duct 53 serves to feed fluid to the thrust bearing, but the bearing is not in direct communication with the supply at 47. The fluid from 47 enters an internal circumferential groove 54 in the housing 1, of which the upper edge is square. A circumferential groove 55 in the body 45 also having a square lower edge cooperates with the groove 54 in the manner of a slide valve and regulates the supply of lubricant in accordance with the position of the body 45 in the housing 1. When the shaft 2 is raised, due to the thrust being small, the supply of fluid is throttled by the grooves 54 and 55 leaving a minimum gap between them. With a heavy thrust the shaft 2 descends slightly and enlarges the flow cross section between the grooves 54 and 55, thereby permitting fluid at higher pressure to pass through the duct 53 to the thrust bearing, which compensates for the increased thrust carried by the shaft.

With the arrangement as just described there is a constant but small leakage of fluid inwards towards the axis and a leakage dependant on the thrust outwards over the ridge 57. It is also possible to fit a second ridge 58 concentric with the axis to bound the pocket towards the axis. The fluid leakage in the inward direction is then likewise dependant on the thrust.

A flinger 56 is mounted at the bottom of the shaft to guard against leakage of fluid through the clearance at the lower end of the housing 1.

What is claimed is:

1. A bearing comprising a bearing part fixed against rotation, a bearing part rotatable relatively to the first-said bearing part, a smooth working face on said rotatable bearing part, a plurality of pockets on said fixed bearing part, each pocket comprising an uninterrupted ridge in the shape of a closed loop individual to that pocket and upstanding from said fixed bearing part, the top of the ridge being spaced with a small clearance from said smooth working face of the rotatable bearing part, each of said ridges being separate from the other pocket ridges and said ridges being spaced apart from each other around the axis of rotation of the rotatable bearing part, means for supplying fluid under pressure to each pocket, whereby fluid is forced through the small clearance between the top of each ridge and the smooth working face of the rotatable bearing part around the whole of the associated loop and passes into the space around and between the ridges, and means for conducting the fluid away from said space.

2. A bearing as claimed in claim 1 in which each pocket is of tear-drop shape having a tapering end pointing in the direction of rotation of said rotatable bearing part.

3. A bearing as claimed in claim 1 in which said smooth working face of the rotatable bearing part is conical.

4. A bearing comprising a bearing part fixed against rotation; a bearing part rotatable relatively to the first-said bearing part, a smooth, conical, working face on said rotable bearing part, a plurality of tear-drop shape pockets on said fixed bearing part having tapering ends pointing in the direction of rotation of said rotatable bearing part and away from the axis of rotation, each pocket comprising an uninterrupted ridge in the shape of a closed loop, the top of the ridge being spaced with a small clearance from said smooth working face of the rotatable bearing part, said ridges being spaced apart from each other around the axis of rotation of the rotatable bearing part, means for supplying fluid under pressure to each pocket, whereby fluid is forced through the small clearance between the top of each ridge and the smooth working face of the rotatable bearing part around the whole of the loop and passes into the space around and between the ridges, and means for conducting the fluid away from said space.

5. A bearing combination comprising a rotatable member, two bearing parts carried by said rotatable member, which bearing parts have smooth, conical, working faces with apexes, pointing in opposite directions, two bearing parts each associated with one of the rotatable bearing parts and each fixed against rotation, a plurality of pockets on each of said fixed bearing parts, each pocket comprising an uninterrupted ridge in the shape of a closed loop individual to that pocket and upstanding from said fixed bearing part, the top of the ridge being spaced with a small clearance from the smooth working face of the associated rotatable bearing part, each of said ridges on each fixed bearing part being separate from the other pocket ridges and said ridges being spaced apart from each other around the axis of rotation of the rotatable bearing parts, means for supplying fluid under pressure to each pocket, whereby fluid is forced through the small clearance between the top of each ridge and the smooth working face of the rotatable bearing part around the whole of the associated loop and passes into the space around and between the ridges, and means for conducting the fluid away from said space.

6. A bearing combination as claimed in claim 5 in which each pocket is of tear-drop shape having a tapering end pointing in the direction of rotation of the rotatable bearing parts and away from the axis of rotation.

7. A bearing combination as claimed in claim 5 in which the apexes of said conical working faces point away from one another, one of said bearing parts fixed against rotation is axially movable and spring means are provided urging said part towards the other bearing part fixed against rotation.

8. A bearing combination as claimed in claim 7 in which a thrust bearing is provided comprising a rotatable conical thrust member carried by said rotatable member, a fixed thrust member associated with the rotatable thrust member, a circular ridge on one of said thrust members concentric with the axis of rotation and defining a closed pocket between the thrust members, the top of the ridge being spaced with a small clearance from the adjacent thrust member, and means for supplying fluid under pressure to the pocket.

9. A bearing combination as claimed in claim 8 in which there are provided a housing to which said fixed thrust bearing is secured, a body slidable axially within the housing and carrying said fixed bearing parts, and spring means between the housing and the body acting in a direction to apply an initial load to said thrust bearing.

10. A bearing combination as claimed in claim 9 in which the internal surface of the housing and the external surface of the body are provided with grooves, said grooves being located in the means for supplying fluid under pressure to the pocket of the thrust bearing and constituting slide valve means varying the feed of fluid to the pocket in accordance with the distance of separation of the two thrust members.

11. A bearing comprising a bearing part fixed against rotation, a second bearing part rotatable relatively to the first said bearing part, a smooth, conical, working face on said rotatable bearing part, a plurality of pockets on said fixed bearing part having tapered ends pointing away from the axis of rotation, each pocket comprising a narrow, upstanding uninterrupted ridge in the shape of a closed loop, the portion of the ridge remote from the axis of rotation being outwardly convex and the top of the ridge being spaced with a small clearance from said smooth working face of the rotatable bearing part, said ridges being spaced apart from each other around the axis of rotation of the rotatable bearing part, means including a fluid inlet positioned adjacent each ridge at a position diametrically opposed to the tapering end thereof for supplying fluid under pressure to the associated pocket, whereby fluid is forced through the small clearance between the top of each ridge and the smooth working face of the rotatable bearing part around the whole of the loop and passes into the space around and between the ridges, and means for conducting the fluid away from said space.

12. A bearing as claimed in claim 11, in which each ridge has a continuously smooth internal configuration.

13. A bearing comprising a bearing part fixed against rotation, a bearing part rotatable relatively to the first said bearing part, a smooth, conical, working face on said rotatable bearing part, a plurality of pockets on said fixed bearing part, said pockets each being of asymmetrical shape about a generating line of the working face and having tapered ends pointing away from the axis of rotation, each pocket comprising a narrow, upstanding, uninterrupted ridge in the shape of a closed loop, the top of the ridge being spaced with a small clearance from said smooth working face of the rotatable bearing part, said ridges being spaced apart from each other around the axis of rotation of the rotatable bearing part, means for supplying fluid under pressure to each pocket, whereby fluid is forced through the small clearance between the top of each ridge and the smooth working face of the rotatable bearing part around the whole of the loop and passes into the space around and between the ridges, and means for conducting the fluid away from said space.

14. A bearing comprising a bearing part fixed against rotation, a bearing part rotatable relatively to the first said bearing part, a smooth, conical, working face on said rotatable bearing part, a plurality of pockets on said fixed bearing part, each pocket comprising a narrow upstanding ridge uninterrupted throughout its length, in the shape of a closed loop, and having a continuously smooth internal configuration, the top of the ridge being spaced with a small clearance from said smooth working face of the rotatable bearing part, said ridges being spaced apart from each other around the axis of rotation of the rotatable bearing part, means for supplying fluid under pressure to each pocket, whereby fluid is forced through the small clearance between the top of each ridge and the smooth working face of the rotatable bearing part around the whole of the loop and passes into the space around and between the ridges, and means for conducting the fluid away from said space.

15. A bearing as claimed in claim 14, in which the external configuration of each ridge is parallel to the internal configuration thereof.

16. A bearing as claimed in claim 15, in which the portion of each ridge remote from the axis of rotation is outwardly convex.

17. A bearing combination comprising a rotatable member, two bearing parts carried by said rotatable member, which bearing parts have smooth, conical, working faces with apexes pointing in opposite directions, two bearing parts each associated with one of the rotatable bearing parts and each fixed against rotation, a plurality of pockets on each of said fixed bearing parts, each pocket comprising a narrow upstanding uninterrupted ridge in the shape of a closed loop, the portion of the ridge remote from the axis of rotation being outwardly convex and the top of the ridge being spaced with a small clearance from the smooth working face of the associated rotatable bearing part, said ridges on each fixed bearing part being spaced apart from each other around the axis of rotation of the rotatable bearing parts, means for supplying fluid under pressure to each pocket, whereby fluid is forced through the small clearance between the top of each ridge and the smooth working face of the rotatable bearing part around the whole of the loop and passes into the space around and between the ridges, and means for conducting the fluid away from said space.

18. A combined thrust and journal bearing comprising a rotatable member, two bearing parts carried by said rotatable member, which bearing parts have smooth, conical, working faces with apexes pointing in opposite directions, two bearing parts each associated with one of the rotatable bearing parts and each fixed against rotation, a plurality of pockets on each of said fixed bearing parts, each pocket comprising a narrow ridge uninterrupted throughout its length, in the shape of a closed loop and having a continuously smooth internal configuration, the top of the ridge being spaced with a small clearance from the smooth working face of the associated rotatable bearing part, said ridges on each fixed bearing part being spaced apart from each other around the axis of rotation of the rotatable bearing parts, means for supplying fluid under pressure to each pocket, whereby fluid is forced through the small clearance between the top of each ridge and the smooth working face of the rotatable bearing part around the whole of the loop and passes into the space around and between the ridges, and means for conducting the fluid away from said space.

19. A combined axial and radial thrust bearing comprising a fixed bearing part, a bearing part rotatable relative to the fixed bearing part, a substantially conical bearing face on said fixed bearing part, a cooperating smooth conical bearing surface on the rotatable bearing part, said two bearing faces being slightly spaced apart in operation of the bearing to provide a fluid space between them, a plurality of mutually separated fluid inlets spaced around the axis of the bearing on the fixed bearing surface, means for continuously supplying fluid under pressure to said fluid inlets, a narrow uninterrupted, upstanding ridge in the shape of a closed loop surrounding each inlet and positioned so that said inlet lies in close proximity to the said ridge at one position in the length thereof, said ridges upstanding into said fluid space to control the leakage of fluid away from the fluid inlets, thereby dividing the fluid space into a plurality of high pressure regions in which the fluid pressure is a maximum, and a single low pressure region in which the fluid pressure is less than said maximum, and means for conducting the fluid away from said low pressure region.

References Cited in the file of this patent

UNITED STATES PATENTS

| | | |
|---|---|---|
| 1,567,018 | Amsden | Dec. 22, 1925 |
| 2,389,687 | Rickenmann | Nov. 27, 1945 |
| 2,660,485 | Gerard | Nov. 24, 1953 |
| 2,684,272 | Annen | July 20, 1954 |